Aug. 5, 1969 K. HOYER 3,459,006
COOLING APPARATUS FOR AUTOMOTIVE VEHICLES
Filed Sept. 28, 1967
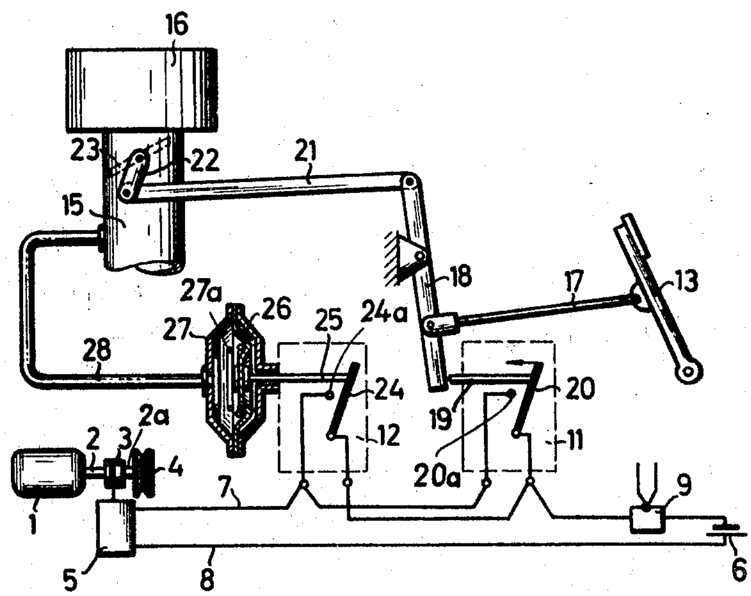
INVENTOR
Karl HOYER
by
Michael S. Striker
HIS ATTORNEY 3,459,006

COOLING APPARATUS FOR AUTOMOTIVE VEHICLES

Karl Hoyer, Leinfelden, Germany, assignor to Robert Bosch G.m.b.H., Stuttgart, Germany Filed Sept. 28, 1967, Ser. No. 671,480
Claims priority, application Germany, Oct. 10, 1966, B 89,275
Int. Cl. B60h *3/04;* F25b *49/00*
U.S. Cl. 62—209 9 Claims

ABSTRACT OF THE DISCLOSURE

The compressor of an air conditioning apparatus for automotive vehicles receives motion through a magnetic clutch which can be energized in response to closing of an adjustable thermostatic switch in series with a first auxiliary switch which is closed when the gas pedal is moved from starting position. A second auxiliary switch is connected in parallel with the first auxiliary switch and closes when the pressure in the suction pipe of the engine drops below a predetermined value. The first auxiliary switch insures that the compressor cannot be driven when the engine is idling, and the second auxiliary switch insures that the compressor can be driven when the gas pedal is in starting position but the vehicle is in motion when the engine is coasting, e.g., because the vehicle travels downhill at which time the pressure in the suction pipe drops below the aforementioned predetermined value. The connection between the pedal and the first auxiliary switch includes a link train and the connection between the second auxiliary switch and the suction pipe includes a diaphragm one side of which is under atmospheric pressure and the other side of which is under the same pressure as that in the suction pipe.

Background of the invention

The present invention relates to cooling apparatus in general, and more particularly to improvements in cooling apparatus which can be utilized for air conditioning of passenger compartments in automotive vehicles and receive motion from the internal combustion engine through a magnetic clutch. In heretofore known cooling apparatus of the just described character, the clutch is energized in response to closing of an adjustable thermostatic switch. When the thermostatic switch is closed while the engine is idling, the r.p.m. of the engine changes considerably due to the fact that the engine must drive the compressor of the cooling apparatus. This is particularly felt in compact vehicles with small engines. In fact, it can happen that, for a normal adjustment of the carburetor, the engine is brought to a standstill if the electric circuit of the clutch is completed during idling. If the carburetor is adjusted in a sense to prevent stoppage of the engine when the clutch is energized while the engine is idling, the r.p.m. of the engine increases undesirably when the clutch is deenergized during idling.

Summary of the invention

It is an object of my invention to provide a novel and improved electric circuit for a clutch which drives the compressor of a cooling apparatus in an automotive vehicle and to assemble the circuit in such a way that the compressor cannot be driven at all when the engine is idling.

Another object of the invention is to provide an electric circuit which can energize the clutch even if the gas pedal is held in starting position as long as the engine is not idling.

A further object of the invention is to provide a novel assembly of switches in the electric circuit of the magnetic clutch for the compressor in a cooling or air conditioning apparatus for automotive vehicles wherein the compressor can be driven by the shaft of the engine.

An additional object of the invention is to provide an automotive vehicle which embodies the above outlined circuit.

A concomitant object of the invention is to provide an electric circuit which can energize the magnetic clutch for the compressor of a cooling apparatus only at such times when the vehicle is in motion.

The improved electric circuit comprises a magnetic clutch having an input portion which can be driven by the crankshaft of the internal combustion engine in an automotive vehicle and an output member which is connected with the compressor of a cooling apparatus, a battery or another suitable source of electrical energy in series with the clutch, an adjustable thermostatic switch in series with the battery and clutch and arranged to close at a predetermined temperature, and an auxiliary switch which is in series with the thermostatic switch and is arranged to close in predetermined positions of the gas pedal (namely, whenever the gas pedal is moved from starting position corresponding to idling of the engine). The circuit preferably further comprises a second auxiliary switch which is connected in parallel with the first auxiliary switch and closes automatically when the pressure in the suction pipe of the engine drops below a predetermined value. In this way, the second auxiliary switch can complete the electric circuit irrespective of the position of the first auxiliary switch when the engine is coasting, for example, when the vehicle rolls downhill, because the pressure in the suction pipe of the engine is then below the aforementioned predetermined pressure.

The novel features which are considered as characteristic of the invention are set forth in particular in the appended claims. The improved electric circuit itself, however, both as to its construction and its mode of operation, together with additional features and advantages thereof, will be best understood upon perusal of the following detailed description of a specific embodiment with reference to the accompanying drawing.

Brief description of the drawing

The single figure is a schematic view of a portion of an automotive vehicle which embodies an internal combustion engine, a cooling apparatus, and an electric circuit including a magnetic clutch which can drive the compressor of the cooling apparatus.

Description of the preferred embodiment

The cooling apparatus comprises a compressor 1 which can be driven by the output member 2 of a magnetic clutch 3. The input member 2*a* of the clutch 3 is driven by a driving member 4 here shown as a pulley which receives motion from a belt driven by the crankshaft of the engine in the automotive vehicle whose passenger compartment is cooled by the apparatus including the compressor 1. The engine further comprises a suction pipe 15 leading from a carburetor 16. The suction pipe 15 accommodates a valve 23 which regulates the flow of fuel-air mixture and is connected with an actuating member or gas pedal 13 by means of a connection including a link train composed of a rod 17, a two-armed lever 18, a first link 21 and a second link 22. The pedal 13 is shown in starting position corresponding to the standstill or idling of the engine.

The electric circuit which includes the clutch 3 further comprises a magnetic switch 5 which can be said to form part of the clutch 3 and is connected in series with a battery 6 or other suitable source of electrical energy, an adjustable thermostatic switch 9 of known design which can close when the temperature in the passenger compartment rises to a preselected value, and two auxiliary switches 11, 12 which are connected in series with the thermostatic switch 9 but in parallel with each other. A first conductor 8 connects one pole of the battery 6 with one terminal of the switch 5 and the other terminal of this switch is connected with the other pole of the battery 6 by a second conductor 7 which contains the switches 9, 11 and 12. Thus, the clutch 3 can be energized only when the thermostatic switch 9 is closed simultaneously with at least one of the auxiliary switches 11, 12.

The position of the moving contact 20 in the auxiliary switch 11 depends on the position of the gas pedal 13. The connection between the moving contact 20 and pedal 13 includes a link train which comprises the aforementioned rod 17 and two-armed lever 18 as well as a trip 19 which is connected with the contact 20 and extends into the path of movement of the lower arm of the lever 18. When the driver removes his or her foot from the pedal 13, a return spring (not shown) maintains the pedal in the illustrated starting position whereby the lever 18 holds the contact 20 in inoperative position so that the auxiliary switch 11 is open because the contact 20 cannot engage the fixed contact 20*a*. This means that the switch 11 is open when the engine is idling and also when the engine is running but the pedal is not depressed (for example, during coasting when the vehicle travels downhill). The fact that the switch 11 will close when the gas pedal is depressed while the engine is at a standstill is of no consequence because the driving member 4 is then idle. When the pedal 13 is depressed, the switch 11 closes and the link train 17, 18, 21, 22 adjusts the position of the valve 23 so that the cylinders of the engine receive larger quantities of fuel-air mixture through the suction pipe 15.

The second auxiliary switch 12 comprises a moving contact 24 and a fixed contact 24*a*. The contact 24 is movable to open position by a trip 25 which is connected to a deformable diaphragm 26 installed in a hollow casing 27. The diaphragm 26 divides the interior of the casing 27 into a suction chamber which is connected with the suction pipe 15 by a conduit 28 and a second chamber which is in communication with the atmosphere. When the pressure in pipe 15 drops below a predetermined value, the presusre in the right-hand chamber of the casing 27 overcomes the bias of a spring 27*a* in the left-hand chamber and the diaphragm 26 displaces the trip 25 in a direction to the left so that the auxiliary switch 12 closes. The exact pressure at which the diaphragm 26 closes the switch 12 depends on the bias of the spring 27*a*, and such pressure can be adjusted by changing the bias of the spring 27*a* or by replacing this spring with a stronger or weaker spring. The contact 24 can engage the contact 24*a* when the volume of the suction chamber in the casing 27 is reduced to a predetermined value corresponding to a predetermined low pressure in the suction pipe 15. The arrangement is preferably such that the auxiliary switch 12 closes when the pressure in suction pipe 15 and conduit 28 drops to a certain low value which is characteristic of coasting of the engine. The suction during idling and when the engine is accelerated in response to depression of the pedal 13 does not suffice to effect opening of the auxiliary switch 12. The same applies when the engine is at a standstill. This insures that the clutch 3 is energized and the input member 2*a* drives the output member 2 and compressor 1 only when the vehicle is in motion but not when the engine is idling while the pedal 13 remains in illustrated starting position. Thus, the fact that the thermostatic switch 9 is closed does not suffice to start the cooling apparatus; it is necessary to close the auxiliary switch 11 or 12 because each of these switches is connected in series with the switch 9. Furthermore, the compressor 1 can be driven only when the vehicle is in motion and the thermostat switch 9 is closed, i.e., the fact that the auxiliary switch 11 and/or 12 is closed does not suffice to operate the cooling apparatus as long as the temperature is below that temperature which is selected for automatic closing of the switch 9.

The electric circuit of my invention is particularly useful in vehicles with small internal combustion engines whose r.p.m. would drop considerably if the clutch were energized while the engine is idling. The circuit also prevents stoppage of the compressor when the vehicle is in motion but the pedal 13 is permitted to assume its starting position, for example, when the vehicle travels downhill.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letter Patent is set forth in the appended claims.

I claim:

1. An electric circuit for controlling the transmission of motion between a cooling apparatus and an internal combustion engine having a driving member, a suction pipe wherein the pressure varies as a function of the operating condition of the engine and an actuating member movable between a plurality of positions to determine the operating condition of the engine, comprising a magnetic clutch having an input portion receiving motion from said driving member and an output portion connected with said cooling apparatus; a source of electrical energy in series with said clutch; an adjustable thermostatic switch in series with said source and said clutch and arranged to close at a preselected temperature; a first auxiliary switch in series with said thermostatic switch and arranged to close in predetermined positions of said actuating member, said clutch being energized so that said input portion can drive said output portion thereof in response to closing of said thermostatic switch simultaneously with said first auxiliary switch; and a second auxiliary switch in series with said thermostatic switch and in parallel with said first auxiliary switch, said second auxiliary switch being arranged to close in response to a predetermined range of pressures in said suction pipe.

2. An electric circuit as defined in claim 1, wherein said actuating member is the gas pedal of the engine and is movable to and from a starting position corresponding to idling of the engine in which said first auxiliary switch is open.

3. An electric circuit as defined in claim 1, wherein said second auxiliary switch closes when the pressure in said suction pipe drops below a predetermined pressure.

4. An electric circuit as defined in claim 3, wherein said actuating member is the gas pedal of the engine and is movable to and from a starting position corresponding to idling of the engine in which said first auxiliary switch is open.

5. An electric circuit as defined in claim 1, further comprising a connection between said second auxiliary switch and said suction pipe including a hollow casing, a deformable diaphragm installed in said casing and dividing its interior into a suction chamber in communication with said suction pipe and a second chamber in communication with the atmosphere so that the diaphragm is deformed to reduce the volume of said suction chamber in response to a pressure drop in said suction pipe, and a trip connected with said diaphragm and arranged to maintain said second auxiliary switch in open position when the volume of said suction chamber exceeds a predetermined value.

6. An electric circuit as defined in claim 1, wherein said actuating member is a gas pedal which is movable to and from a starting position and further comprising a connection between said gas pedal and said first auxiliary switch to maintain the latter in open position in the starting position of said pedal.

7. An electric circuit as defined in claim 6, wherein said connection comprises a link train.

8. An electric circuit as defined in claim 1, wherein said actuating member is a gas pedal arranged to control the flow of a fuel-air mixture through said suction pipe and said engine is installed in an automotive vehicle.

9. An electric circuit as defined in claim 8, wherein said cooling apparatus is arranged to cool the passenger compartment of the vehicle and comprises a compressor connected with the output portion of said clutch.

References Cited

UNITED STATES PATENTS

| | | | |
|---|---|---|---|
| 2,916,880 | 12/1959 | Hann | 62—323 |
| 3,102,398 | 9/1963 | Schjalin | 62—323 |
| 3,103,128 | 9/1963 | Gordon | 62—228 |
| 3,186,184 | 6/1965 | Pruitt | 62—323 |

MEYER PERLIN, Primary Examiner

U.S. Cl. X.R.

62—226, 228, 323